(12) United States Patent
Orndorff et al.

(10) Patent No.: US 7,441,233 B1
(45) Date of Patent: Oct. 21, 2008

(54) SYSTEM AND METHOD PROVIDING STATUS INDICATION FOR LONG-RUNNING MODAL TASKS

(75) Inventors: Joyce Orndorff, Aptos, CA (US); Blake Stone, Aptos, CA (US)

(73) Assignee: Borland Software Corporation, Austin, TX (US)

( * ) Notice: Subject to any disclaimer, the term of this patent is extended or adjusted under 35 U.S.C. 154(b) by 1085 days.

(21) Appl. No.: 10/412,148

(22) Filed: Apr. 11, 2003

Related U.S. Application Data

(60) Provisional application No. 60/435,166, filed on Dec. 20, 2002.

(51) Int. Cl.
G06F 9/44 (2006.01)
G06F 13/00 (2006.01)

(52) U.S. Cl. .................. 717/125; 717/125; 717/107; 719/331; 719/332

(58) Field of Classification Search ............... 717/125
See application file for complete search history.

(56) References Cited

U.S. PATENT DOCUMENTS

| | | | | |
|---|---|---|---|---|
| 5,175,820 | A | 12/1992 | Gephardt | 710/14 |
| 6,038,588 | A * | 3/2000 | Nagarajayya et al. | 718/102 |
| 6,100,887 | A | 8/2000 | Bormann et al. | 715/764 |
| 6,275,987 | B1 | 8/2001 | Fraley et al. | 717/127 |
| 6,414,697 | B1 | 7/2002 | Amro et al. | 715/772 |
| 6,639,687 | B1 * | 10/2003 | Neilsen | 358/1.14 |
| 6,664,982 | B1 | 12/2003 | Bi | 715/773 |
| 6,691,151 | B1 * | 2/2004 | Cheyer et al. | 709/202 |
| 6,769,124 | B1 * | 7/2004 | Schoening et al. | 719/316 |
| 6,779,060 | B1 | 8/2004 | Azvine et al. | 710/65 |
| 6,826,748 | B1 | 11/2004 | Hohensee et al. | 717/130 |
| 6,826,758 | B1 | 11/2004 | Chew et al. | 719/328 |
| 6,834,386 | B1 | 12/2004 | Douceur et al. | 718/107 |
| 6,847,778 | B1 | 1/2005 | Vallone et al. | 386/68 |

OTHER PUBLICATIONS

Endo et al., Improving Interactive Performance Using TIPME, 2000, ACM, pp. 240-251.*
B. Goetz, Introduction to Java threads, Sep. 2002, IBM, pp. 1-30.*
Wilson et al., "Java Platform Performance: Strategies and Tactics", Nov. 2001, Sun Microsystems, Inc., 1st Edition, pp. 1-14.*
Gosling, J. et al., Java Language Specification, 2nd Ed. (Chapters 1-5), Sun Microsystems, Inc., Mountain View, CA, Jun. 2000.
Gosling, J. et al., The Java Language Environment: A White Paper, Sun Microsystems Computer Company, Oct. 1995.

* cited by examiner

*Primary Examiner*—Eric B. Kiss
*Assistant Examiner*—Ben C Wang
(74) *Attorney, Agent, or Firm*—John A. Smart; G. Mack Riddle

(57) ABSTRACT

A system and method providing status information about a task being processed on a computer system is described. The task comprises an operation that blocks user activity, such as a modal task. Status information about the task is obtained during processing of the task on an event thread of a computer system. A status display is generated based upon this status information. The task yields time on the event thread, enabling the status information to be displayed in the user interface of the computer system.

34 Claims, 7 Drawing Sheets

US 7,441,233 B1

SYSTEM AND METHOD PROVIDING STATUS INDICATION FOR LONG-RUNNING MODAL TASKS

CROSS REFERENCE TO RELATED APPLICATIONS

Referenced-Applications

The present application is related to and claims the benefit of priority of the following commonly-owned, presently-pending provisional application(s): application Ser. No. 60/435,166, filed Dec. 20, 2002, entitled "System and Method Providing Status Indication for Long-Running Modal Tasks", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to a system providing methods for facilitating development and maintenance of software applications or systems, with particular emphasis on a system and method providing status indication for long-running modal tasks.

2. Description of the Background Art

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C, Pascal, or more recently Java®. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C "object module," which includes instructions for execution ultimately by a target processor, or a compiled Java® class, which includes bytecodes for execution ultimately by a Java® virtual machine. A Java® compiler generates platform-neutral "bytecodes"—an architecturally neutral, intermediate format designed for deploying application code efficiently to multiple platforms.

"Visual" development environments, such as Borland® JBuilder®, are the preferred application development environments for quickly creating production applications. Such environments are characterized by an integrated development environment (IDE) providing a form painter, a property getter/setter manager ("inspector"), a project manager, a tool palette (with objects which the user can drag and drop on forms), an editor, a debugger, and a compiler. In general operation, the user "paints" objects on one or more forms, using the form painter. Attributes and properties of the objects on the forms can be modified using the property manager or inspector. In conjunction with this operation, the user attaches or associates program code with particular objects on the screen (e.g., button object). Typically, code is generated by the IDE in response to user actions in the form painter and the user then manipulates the generated code using the editor. Changes made by the user to code in the editor are reflected in the form painter, and vice versa. After the program code has been developed, the compiler is used to generate binary code (e.g., Java® bytecode) for execution on a machine (e.g., a Java® virtual machine).

Although visual development environments enable applications to be created quickly, problems remain with the development, implementation, operation, and maintenance of production applications. One issue for users of a program or application is the handling of modal tasks by current systems. A modal task is a task that generally suspends user interaction in a program or system until the modal task has completed processing. An example of a modal task is formatting (or reformatting) the hard drive of a computer system. While the hard drive of the computer system is being formatted, the user interface is usually "frozen" and the user is unable to initiate other tasks. In addition, in many cases the user is provided little or no feedback while the modal task is in process, which can be frustrating to the user. The user may not know how long the modal task will take, and in many cases may not be able to cancel or delay running of the modal task once it has been initiated. Accordingly, there is considerable user interest in a solution that provides feedback about the status of such modal tasks and enables the user to cancel the modal task, if desired.

However, displaying a modal progress dialog (or other status indication) while performing a lengthy modal task presents a number of problems for a program or application (e.g., an application written in the Java® programming language) if the task is performing on the event thread. Typically, if both the task and the progress indication (e.g., animation or dialog box presented in the user interface) are running on the same thread, the status will not update properly and the progress indication will not be painted (or repainted) while the modal task is in process. In addition, any user input, such as requests to cancel the modal task, cannot be processed until after the task has been completed, thus invalidating or ignoring the user input.

For instance, in an application written in the Java® language and running in a Java® virtual machine environment, the Java® event thread is generally responsible for watching interaction with a graphical user interface (GUI), refreshing the user interface (UI), and dispatching UI events. The event thread dispatches UI events by periodically examining the system event queue for any UI events such as mouse clicks or keystrokes. Threads execute tasks sequentially and a thread can only perform one task at a time. Thus, when the event thread is being used for executing a lengthy modal task, the user interface cannot be refreshed and events cannot be processed during the duration of the modal task. This effectively renders any sort of modal progress dialog that provides feedback on the status of the lengthy task useless, because the dialog's user interface is managed on the event thread and therefore cannot be refreshed until the modal task has completed. In addition, the user is usually unable to cancel the modal task since any user input will not be processed until after the task has been completed.

Some of these problems may be addressed by running the task on a separate background thread, and incorporating the use of a progress indication dialog on the main event thread. However, this approach may result in decreased performance. For example, in a Java® environment a modal task can generally be processed faster on the Java® event thread than on other threads. However the event thread is also the thread that handles user interface events, so the progress indication is also usually run on the event thread. Accordingly, while it may be possible to execute the lengthy task on a thread other than the event thread, the use of the event thread is desirable in many instances for performance reasons and/or in order to avoid thread synchronization issues.

Accordingly, a solution is required for providing users with an indication of the progress of modal tasks which are running on the event thread of a system. Ideally, the solution should also provide users with the ability to cancel a modal task while it is being processed. The present invention provides a solution for these and other needs.

SUMMARY OF INVENTION

A system and method providing status information about a task being processed on a computer system is described. The task comprises an operation that blocks user activity, such as a modal task. Status information about the task is obtained during processing of the task on an event thread of a computer system. A status display is generated based upon this status information. The task yields time on the event thread, enabling the status information to be displayed in the user interface of the computer system.

In another embodiment, an operation is processed on a given thread of a computer system while a status indication is provided to a user on the same thread. While processing the operation on the given thread of the computer system, the operation periodically yields time on the thread to enable other processing to be performed on the thread. The following substeps are performed when the operation yields time on the thread: determining progress made in completing the operation; preparing a status indication based upon the progress determination; and providing the status indication to the user.

In another embodiment a system for providing progress indication about execution of a modal task comprises: a modal task object for representing a modal task being executed and collecting information about the execution of the modal task; a task monitor module for monitoring the modal task object as it executes and generating a progress indication based on the collected information; and an event handling module for interrupting execution of the modal task to display the progress indication to the user.

DETAILED DESCRIPTION

Glossary

Figure 1:
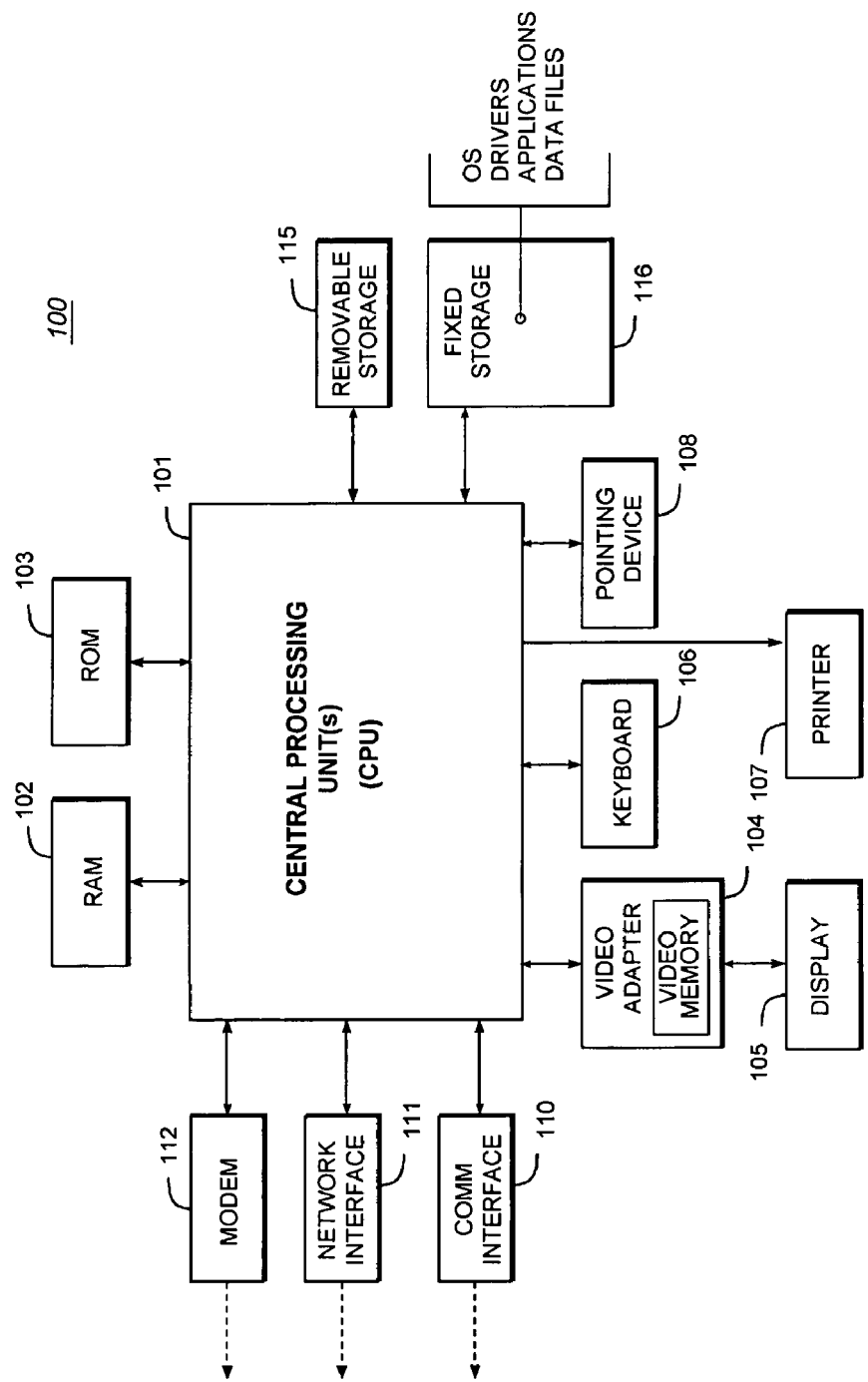
FIG. 1 is a block diagram of a computer system in which software-implemented processes of the present invention may be embodied.

The following definitions are offered for purposes of illustration, not limitation, in order to assist with understanding the discussion that follows.

Bytecode: A virtual machine executes virtual machine low-level code instructions called bytecodes. Both the Sun Microsystems® Java® virtual machine and the Microsoft®. NET virtual machine provide a compiler to transform the respective source program (i.e., a Java® program or a C# program, respectively) into virtual machine bytecodes.

Compiler: A compiler is a program which translates source code into binary code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A Java® compiler translates source code written in the Java® programming language into bytecode for the Java® virtual machine.

Interpreter: An interpreter is a module that alternately decodes and executes every statement in some body of code. A Java® runtime interpreter decodes and executes bytecode for the Java® virtual machine.

Java: Java® is a general purpose programming language developed by Sun Microsystems. Java® is an object-oriented language similar to C++, but simplified to eliminate language features that cause common programming errors. Java® source code files (files with a .java extension) are compiled into a format called bytecode (files with a .class extension), which can then be executed by a Java® interpreter. Compiled Java® code can run on most computers because Java® interpreters and runtime environments, known as Java® virtual machines (VMs), exist for most operating systems, including UNIX®, the Macintosh® OS, and Windows®. Bytecode can also be converted directly into machine language instructions by a just-in-time (JIT) compiler. Further description of the Java® Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java® programming language (e.g., version 2), see e.g., "Java 2 SDK, Standard Edition Documentation, version 1.4.1," from Sun Microsystems, the disclosure of which is hereby incorporated by reference. A copy of this documentation is currently available via the Internet at java-.sun.com/j2se/1.4.1/docs/index.html.

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

Introduction

The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif.

Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, drivers, and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. The printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
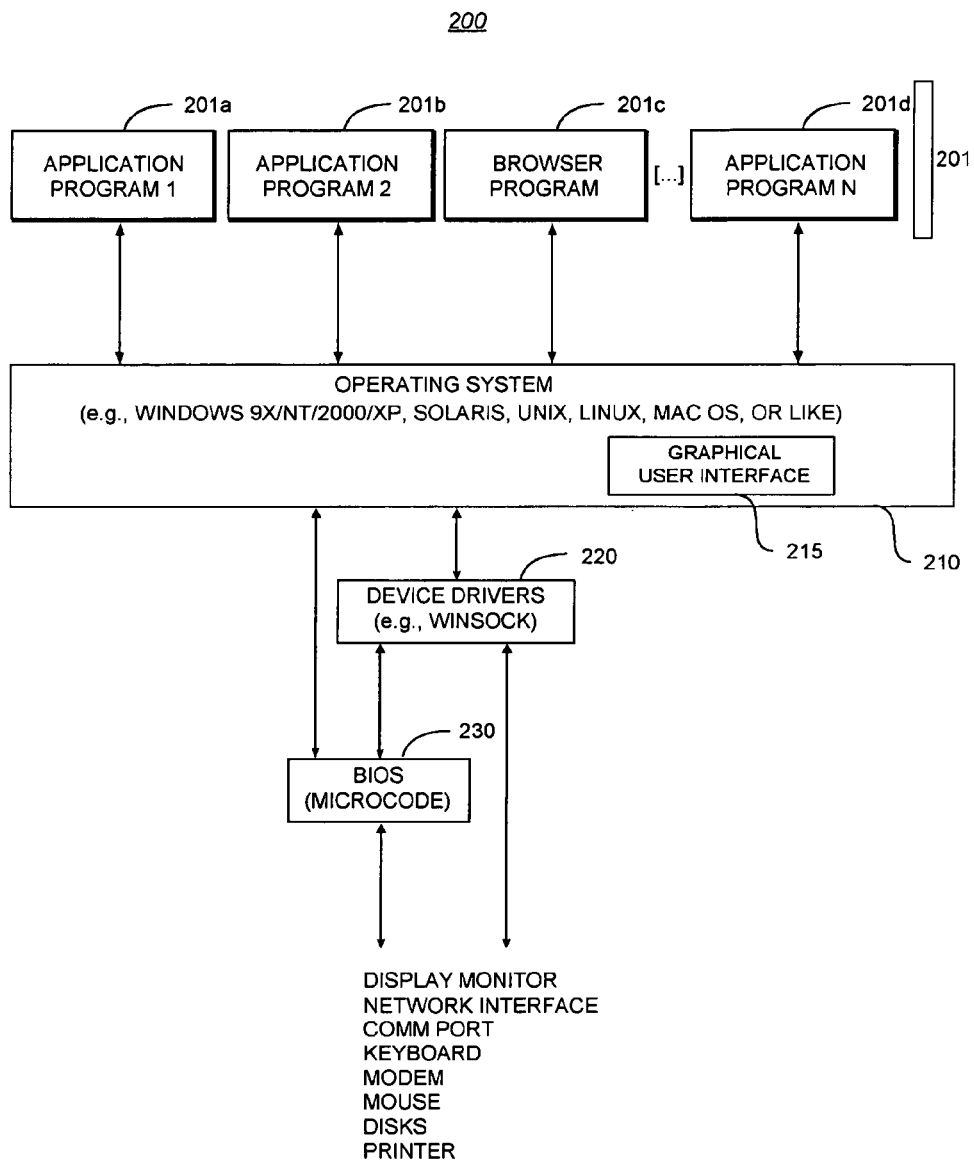
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from the operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists at least one computer running applications developed using the Java® programming language. The present invention, however, is not limited to any particular environment or device configuration. In particular, use of the Java® programming language is not necessary to the invention, but is used to provide a framework for discussion. Instead, the present invention may be implemented in any type of system architecture or processing environment capable of supporting the methodologies of the present invention presented in detail below.

Java® is a simple, object-oriented language which supports multi-thread processing and garbage collection. Although the language is based on C++, a superset of C, it is much simpler. More importantly, Java® programs are "compiled" into a binary format that can be executed on many different platforms without recompilation. A typical Java® system comprises the following set of interrelated technologies: a language specification; a compiler for the Java® language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Figure 3A:
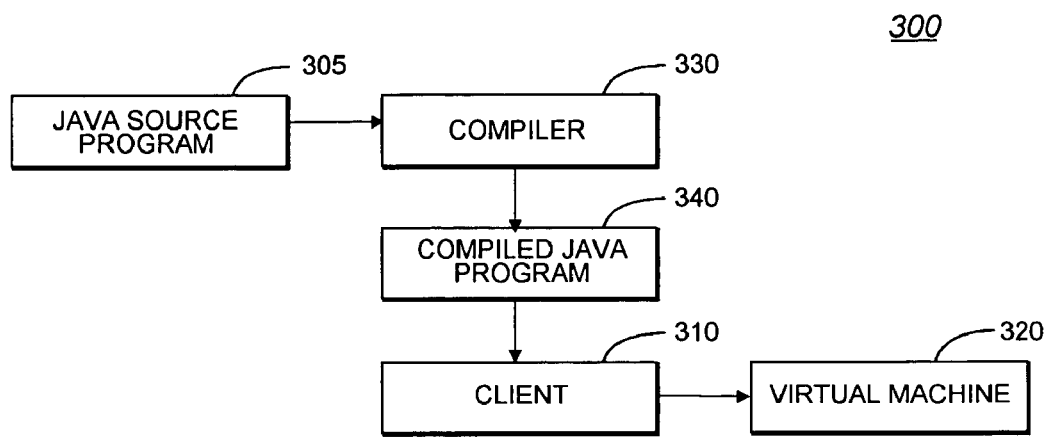
FIG. 3A is a block diagram of a Java® development system suitable for implementing the present invention.

Shown in further detail in FIG. 3A, a Java® development system 300 suitable for implementing the present invention includes a client 310 which employs a virtual machine 320 for executing programs. In particular, the client 310 executes a "compiled" (i.e., bytecode or pseudo-compiled) Java® program 340, which has been created by compiling a Java® source code program or script 305 with a Java® compiler 330. Here, the Java® source code program 305 is an application program written in the Java® programming language; the pseudo-compiled program 340, on the other hand, comprises the bytecode emitted by the compiler 330. The virtual machine 320 includes a runtime interpreter for interpreting the Java® (bytecode program 340. During operation, the client 310 simply requests the virtual machine 320 to execute a particular Java® compiled program.

Figure 3B:
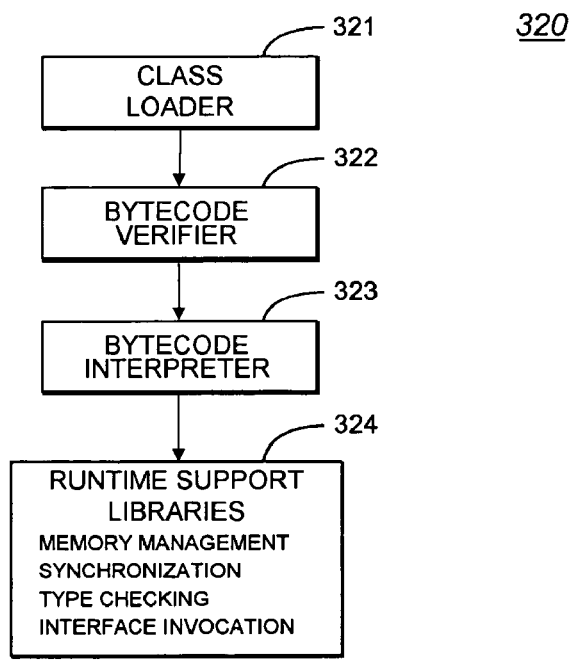
FIG. 3B is a block diagram of a virtual machine illustrated in the Java® development system of FIG. 3A.

As shown in FIG. 3B, the virtual machine 320 comprises a class loader 321, a bytecode verifier 322, a bytecode interpreter 323, and runtime support libraries 324. The class loader 321 is responsible for unpacking the class file which has been requested by a client. Specifically, the class loader 321 will unpack different sections of a file and instantiate in-memory corresponding data structures. The class loader will invoke itself recursively for loading any superclasses of the current class which is being unpacked.

The bytecode verifier 322 verifies the bytecode as follows. First, it checks whether the class has the correct access level. Since the class will access other classes for invoking their methods, the bytecode verifier 322 must confirm that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These static variables comprise the variables which are present only once (i.e., only one instance), for all objects of the class.

Runtime support libraries 324 comprise functions (typically, written in C) which provide runtime support to the virtual machine, including memory management, synchronization, type checking, and interface invocation. At the client machine on which a Java® application is to be executed, runtime support libraries 324 are included as part of the virtual machine; the libraries are not included as part of the Java® application. The bytecode which is executed repeatedly calls into the runtime support libraries 324 for invoking various Java® runtime functions.

In the currently preferred embodiment, the Java® development system 300 may be provided by Borland® JBuilder® version 7.0 or version 8.0, available from Borland Software Corporation of Scotts Valley, Calif. Further description of the development system 300 may be found in "Building Applications with JBuilder (Version 8)", and "Building Applications with JBuilder (Version 7)", both available from Borland Software Corporation of Scotts Valley, Calif., the disclosure of which are hereby incorporated by reference. The following briefly describes the Java®-based visual development interface provided by the system.

Development Interface

Figure 4:
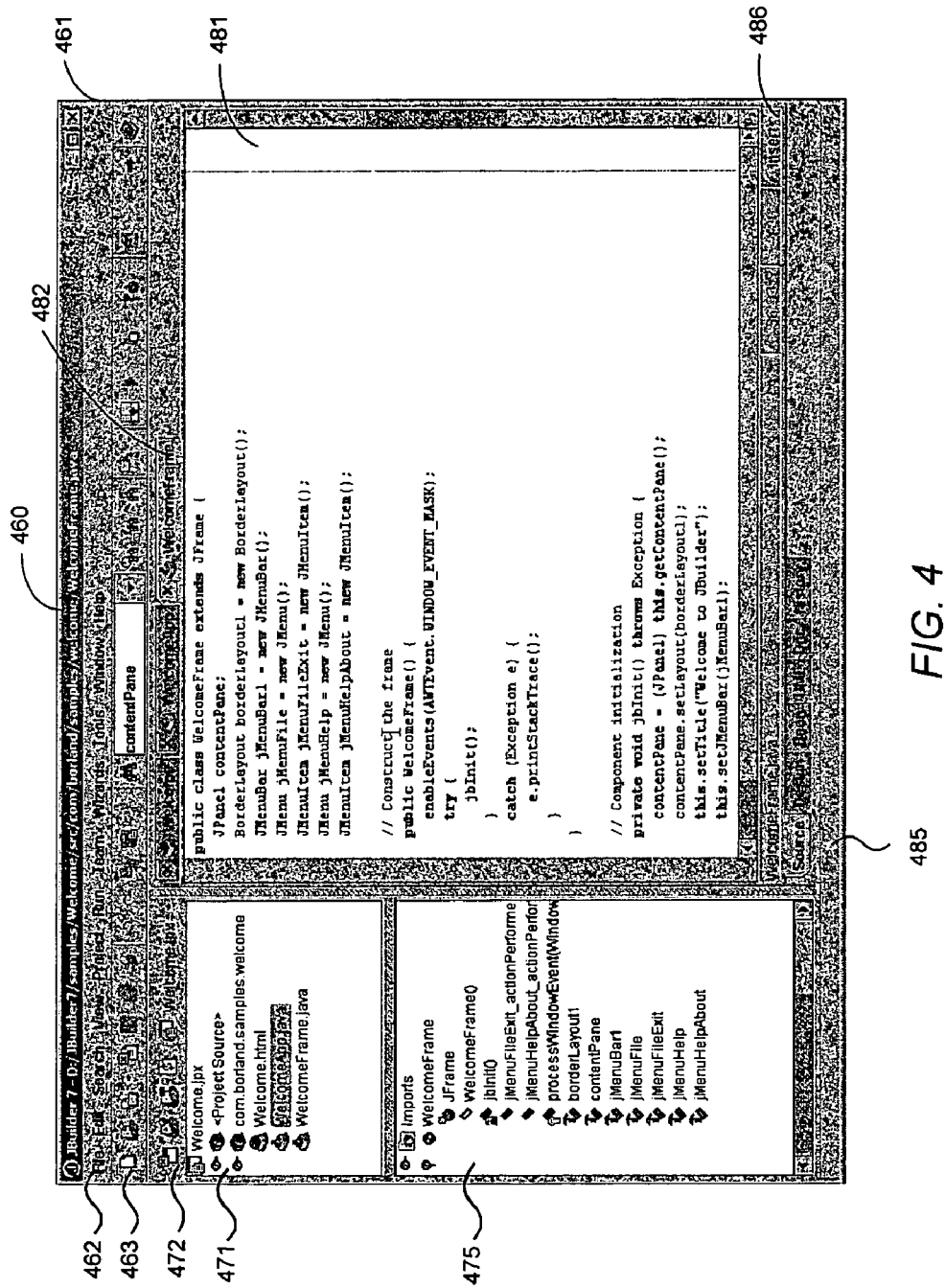
FIG. 4 illustrates a preferred interface of a Java®-based visual development or programming environment provided by the Java® development system.

FIG. 4 illustrates a preferred interface of a Java®-based visual development or programming environment 460 provided by the Java® development system 300. As shown, the programming environment 460 comprises a main window 461, a project pane 471, a structure pane 475, and a content pane 481 (showing the editor). The main window 461 itself includes a main menu 462 and a main toolbar 463. The main menu 462 lists user-selectable commands, in a conventional manner. For instance, the main menu 462 invokes "File", "Edit", "Search", "View" submenus, and the like. Each submenu lists particular choices which the user can select. Working in conjunction with the main menu, the main toolbar 463 provides the user with shortcuts to the most common commands from the main menu, such as opening or saving a project. The main toolbar 463 is displayed under the main menu and is composed of smaller toolbars grouped by functionality. The main toolbar is configurable by the user for including icons for most of the menu commands.

To develop a software program in the development environment, a user typically first creates a "project" to organize the program files and maintain the properties set for the program. The project pane 471 contains a list of the open project(s) and a tree view of the contents of the active project. As shown at FIG. 4, the active project file is the top node in the project pane 471 and the content pane 481 displays the contents of the active project file. In the currently preferred embodiment, the project pane 471 also includes a project pane toolbar 472 which includes buttons for closing a project, adding files or packages (e.g., by opening an "Add Files or Packages to Project" dialog box), removing files from a project, and refreshing the project (e.g., searching for source packages for the project).

The structure pane 475 displays the structure of the file currently selected in the content pane 481. The file structure is displayed in the form of a tree showing the members and fields in the selected file. When appropriate, the structure pane 475 also displays an "Errors" folder (not shown) containing any syntax errors in the file as well as an "Imports" folder (as shown at the top of the structure pane 475) containing a list of imported packages. In addition to providing a view of the structure of the class, the structure pane facilitates navigating to a class, or its methods or members, in the source code.

The content pane 481 displays all open files in a project as a set of tabs. Files may be opened in the content pane 481 by selecting the file from the project pane 471. The name of each open file is displayed on file tabs 482 at the top of the content pane 481. As shown, multiple file tabs 482 may provide access to various open files. A user may select a file tab (e.g., the "WelcomeFrame" as shown at FIG. 4) to display a particular file in the content pane 481. The content pane provides a full-featured editor that provides access to text (i.e., source code) in a given project.

The content pane 481 provides access to various file views as well as status information by way of file view tabs 485 and a file status bar 486 as shown at the bottom of the content pane. Each of the file view tabs 485 provides a different view of the open file. The file view tabs 485 are context sensitive. Only tabs appropriate to the file open in the content pane appear below its window. For instance, a visually designable Java® file typically has several tabs, including "Source", "Design", "Bean", "UML", "Doc", and "History" as shown at FIG. 4. A user may select the "Source" tab to view source code or the "UML" tab to view Uniform Modeling Language (UML) diagrams for a class or package. The content pane 481 also includes a file status bar 486 which is displayed immediately above the file view tabs 485. The file status bar 486 displays information specific to the current file, such as the name of the file, the cursor location (line number and column), and the insertion mode in a text file.

The following description will focus on those features of the development system 300 which are helpful for understanding the methodology of the present invention for providing progress indication for long-running modal tasks.

Overview and System Components

Figure 5:
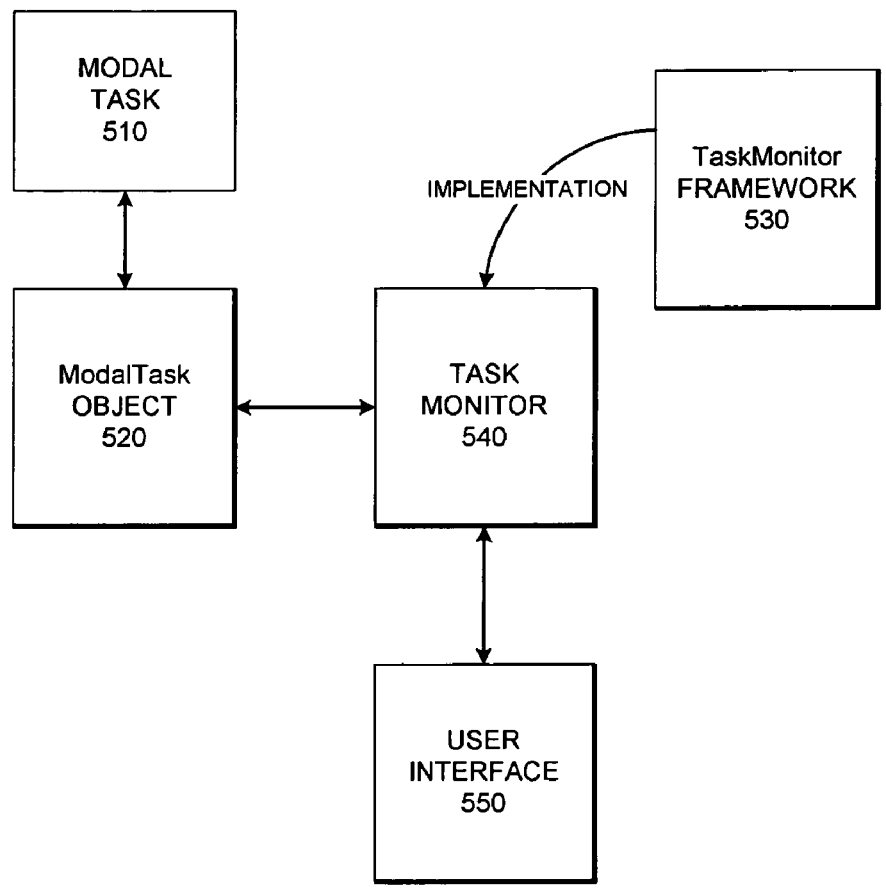
FIG. 5 is a high-level block diagram illustrating an environment in which the present invention may preferably be embodied.

The present invention provides a solution for providing feedback about the progress of a modal task. The solution enables a lengthy operation (i.e., a modal task) to be performed on the system event thread concurrently with providing and managing a progress indication (e.g., visual progress dialog displayed in the user interface) and processing any user input on the same thread. FIG. 5 is a high-level block diagram illustrating an environment 500 in which the present invention may preferably be embodied. As shown, the environment 500 includes a modal task 510, a modal task object 520 (hereinafter referred to as a "ModalTask" object), a Task Monitor 540, and a user interface (UI) 550. Also shown at FIG. 5 is a "TaskMonitor" framework 530. Each of these components will now be described.

The modal task 510 represents a modal task which is running (or about to run) on the system. As previously described, a modal task is a potentially lengthy task that suspends user interaction until it has completed processing. Formatting the hard drive of a computer system is an example of a modal task. For purposes of the following discussion, the modal task 510 is running on the system event thread and blocks additional user activity (except as allowed by the system and methodology of the present invention as described below) until it is completed.

The system of the present invention includes the ModalTask object 520, the TaskMonitor framework 530, and the Task Monitor 540. The ModalTask object 520 is an object that represents a modal task (e.g., modal task 510) that is to be monitored by the Task Monitor 540. Each ModalTask object 520 represents a particular modal task (e.g., modal task 510) for which progress indication is to be communicated to the user as hereinafter described. A plurality of ModalTask objects may be created and managed by the system of the present invention from time to time, although modal tasks themselves run sequentially on a given thread (e.g., the system event thread).

The TaskMonitor framework 530 defines a module for monitoring and reporting the progress of (potentially lengthy) modal tasks. The TaskMonitor framework 530 provides a structure or framework that may be implemented by a developer for displaying a status (or progress) indication while performing a lengthy modal task on the same thread (e.g., the system event thread). The TaskMonitor framework 530 defines what a particular implementation needs to support in order to implement the methodology of the present invention. The TaskMonitor framework may be implemented by a developer in a number of different environments. For example, a developer may use the framework to implement a console-based task monitor (e.g., providing feedback to the user via the command line) or a Java Swing-based implementation such as the Task Monitor 540 of the currently preferred embodiment (providing feedback via a dialog box in a graphical user interface).

The system of the present invention also includes a Task Monitor 540 which is a Java Swing-based (Swing-aware) implementation of the TaskMonitor framework 530. The Task Monitor 540 supports a graphical user interface for displaying the status of the modal task to the user (e.g., via a progress dialog) and receiving user input. The TaskMonitor framework 530 and Task Monitor 540 support performing a modal task on the event queue concurrently with managing one or more tasks and presenting a progress dialog in the user interface. The Task Monitor 540 may be used to track a number of modal tasks and monitor how each of these tasks is performing. In the currently preferred embodiment, the Task Monitor 540 provides progress indication to the user via the user interface 550 as shown at FIG. 5. In addition, the solution enables user interface events to be periodically processed while the modal task is running as described below.

The user interface 550 provides for user interaction with the Task Monitor 540 in conventional fashion. For example, text, graphic images, and/or other data may be displayed to the user in the user interface 550. The user interface also accepts input from the user (e.g., from a keyboard or pointing device). For instance, a dialog box may be displayed to the user to indicate the status of one or more modal tasks. The user may also provide input using a keyboard or pointer device, which may include canceling a particular task that is running as described below, if desired.

In operation, the Task Monitor 540 (or an alternative implementation based upon the TaskMonitor framework 530) takes control of the event queue periodically and processes user interface (UI) events, including both updating or refreshing the user interface as well as receiving user input as hereinafter described. By accessing and managing the event queue with the Task Monitor 540 and by objectifying modal tasks with the ModalTask object 520, a system constructed in accordance with the present invention successfully maintains visual progress indication of one or more tasks. The user interface no longer experiences "freezing" when a lengthy task is being performed, and user input regarding the running task can also be processed.

The Task Monitor 540 can, for example, be used to display a "busy" cursor in the user interface 550 while a modal task is running. In the currently preferred embodiment, an indeterminate progress dialog is displayed if a modal task takes more than the minimum amount of time. Status descriptions can be displayed and periodically updated in this progress dialog. In addition, the solution is scalable, allowing multiple tasks to register with the Task Monitor simultaneously. The Task Monitor manages the execution of all tasks and displays the tasks that are running as well as the status of such tasks. In addition, the present invention provides support for enabling a user to cancel a modal task while it is being executed. Status descriptions and icons can also be customized for a given task, as well as the user interface update interval.

The TaskMonitor framework also supports feedback mechanisms other than graphical user interface components. This means that the TaskMonitor framework can be used to implement other feedback mechanisms, such as feedback via console when a program is running without a graphical user interface (GUI). The operations of these above-described components of the present invention in an exemplary environment will now be described.

Operations of ModalTask Object and Task Monitor

The following pseudocode illustrates the operations of a ModalTask object and the Task Monitor of the present invention in monitoring an exemplary modal task:

```
1:  ModalTask task = new ModalTask("Formatting your hard drive!",
        allowCancel);
2:  task.start( );
3:  task.setStatus("Preparing media . . . ");
4:  for (int index = 0; index < 40; index++) {
5:      if (task.isCancelRequested( ))
6:          break;
7:      try {Thread.sleep(100); } catch (Exception ex) { }
8:      // do something meaningful instead of just sleeping
9:      task.yield( );
10: }
11: task.setStatus("Almost done");
12: for (int index = 0; index < 80; index++) {
13:     if (task.isCancelRequested( ))
14:         break;
15:     try {Thread.sleep(50); } catch (Exception ex) { }
16:     // do something meaningful instead of just sleeping
17:     task.yield( );
18: }
19: task.setStatus("Finished");
20: task.stop( );
```

The above pseudocode includes a typical series of events illustrating a ModalTask object which is monitored by a Task Monitor constructed in accordance with the present invention. In this example, the lengthy modal task itself is simulated by the thread sleeping as indicated at line 7 above. When a modal task is to be performed, a ModalTask object (instance) is constructed to model the task as illustrated at line 1 above. In this particular case, the modal task that is modeled by this ModalTask object is cancelable as shown at line 1 above ("allowCancel"). The ModalTask object's "start( )" method is invoked at line 2 when the processing of the modal task commences.

During the processing of the modal task, progress is reported by the task to the ModalTask object via calls to "setStatus( )" (e.g., at lines 3 and 11 above). Frequent calls to "task.yield( )" (e.g., at lines 9 and 17 above) cause the task to yield time to the Task Monitor to enable the user interface to be refreshed. If a modal task is cancelable, calls are made periodically to "is CancelRequested( )" (as illustrated at line 13) to determine whether the user wishes to cancel the modal task before it is completed. The ModalTask's "stop( )" method is invoked whether the task is canceled or completes normally as illustrated at line 20 above. The components of the system of the present invention will now be described in greater detail.

TaskMonitor Framework

In the currently preferred embodiment, the TaskMonitor framework 530 is implemented as an abstract class in the Java programming language. Subclasses of this abstract TaskMonitor class (or TaskMonitor framework) are used to provide a concrete user interface for reporting progress by lengthy tasks. The Task Monitor 540 represents a particular implementation of the TaskMonitor framework. In the currently preferred embodiment, a Swing-aware Task Monitor (or "SwingTaskMonitor") is provided for providing feedback to the user via a progress dialog presented in a graphical user interface as described below. However, a developer or user could alternatively implement the TaskMonitor framework to provide feedback through different means. For example, progress could be reported by placing entries into a log file.

A Task Monitor object is registered (e.g., via a "Task.setTaskMonitor( )" method) in order to receive task notification regarding a modal task. The Task Monitor (including the Swing-aware Task Monitor 540 and other implementations of the TaskMonitor framework) can manage multiple tasks concurrently. However, multiple modal tasks placed on the system event thread will run sequentially, as expected.

Task Monitor Implementation

The Task Monitor (or SwingTaskMonitor) 540 is a Swing-aware implementation of the TaskMonitor framework 530 that uses a combination of wait cursors and modal dialogs to communicate the presence of modal tasks. Many tasks typically run on the event thread for simplicity and speed. While providing a modal dialog to display progress on a background thread task is fairly simple, providing a dialog that does not block a task running on the event thread, allows user interface updates, and allows for the user to cancel the task is more complex. The Task Monitor of the present invention implements support for managing multiple tasks on the event queue concurrently with updating the progress dialog.

When a ModalTask object is created and processing of its associated modal task commences, the Task Monitor, in its presently preferred embodiment, changes the cursor to a wait cursor. If the task proceeds for more than a selected wait cursor interval, the Task Monitor displays a progress dialog with an icon, description, and status message. A cancel button will only be visible if the task was specified to be "cancelable". A developer/user can customize the wait cursor interval and the dialog update interval through the Task Monitor's defined set of hints. The icon that is displayed may also be customized, as desired.

Figure 6A:
FIG. 6A illustrates an exemplary progress dialog for a task that can be canceled.

FIG. 6A illustrates an exemplary Task Monitor progress indication (dialog) 610 for a modal task. In this case, the modal task can be canceled as indicted by the cancel button 611. As shown, text is displayed in the progress dialog 610 which informs the user about the modal task being performed (e.g., "Formatting your hard drive . . . ") and the status of the task (e.g., "Almost done . . . "). A standard icon 613 is displayed at FIG. 6A, however, a custom icon can also be set via a task hint.

Figure 6B:
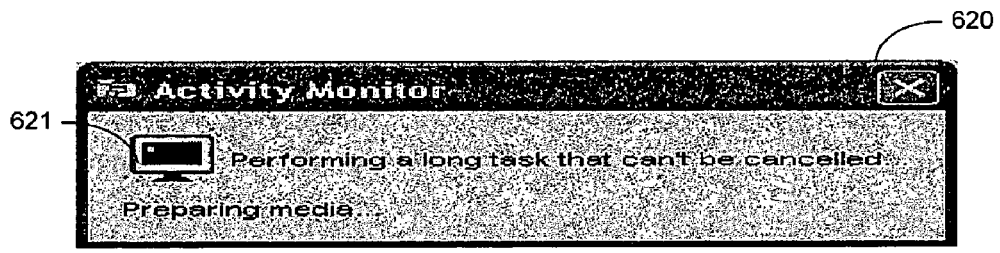
FIG. 6B illustrates an exemplary progress dialog with a custom icon for a task that cannot be canceled.

FIG. 6B illustrates an exemplary progress indication (dialog) 620 which includes a custom icon 621. This progress dialog 620 does not include a cancel button, indicating that the modal task that is being monitored cannot be canceled by the user.

Figure 6C:
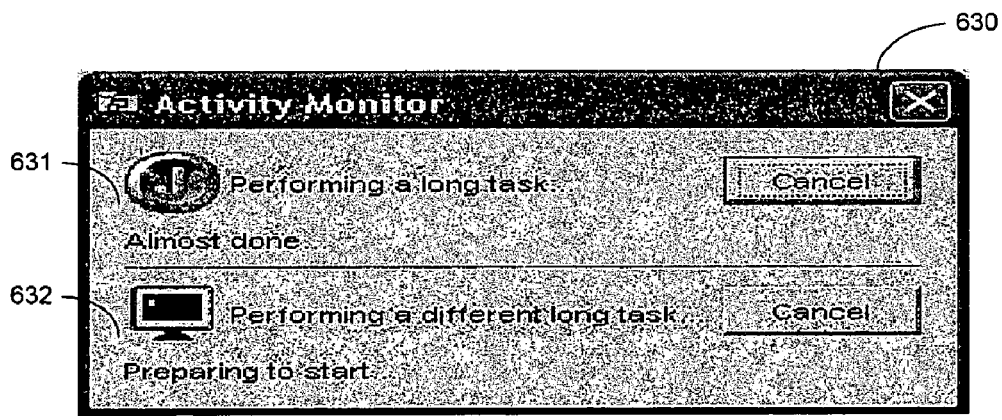
FIG. 6C illustrates an exemplary progress indication showing the monitoring of multiple tasks by the Task Monitor.

FIG. 6C illustrates an exemplary progress indication 630 showing the monitoring of multiple tasks by the Task Monitor of the present invention. As shown at FIG. 6C, the progress dialog 630 includes a dialog 631 displayed to show the status of a first task and a dialog 632 displayed to show the status of a second task. Multiple ModalTask objects can be registered with the Task Monitor and the Task Monitor can concurrently monitor and display progress indication regarding a plurality of tasks.

Methods of Operation

Figure 7:
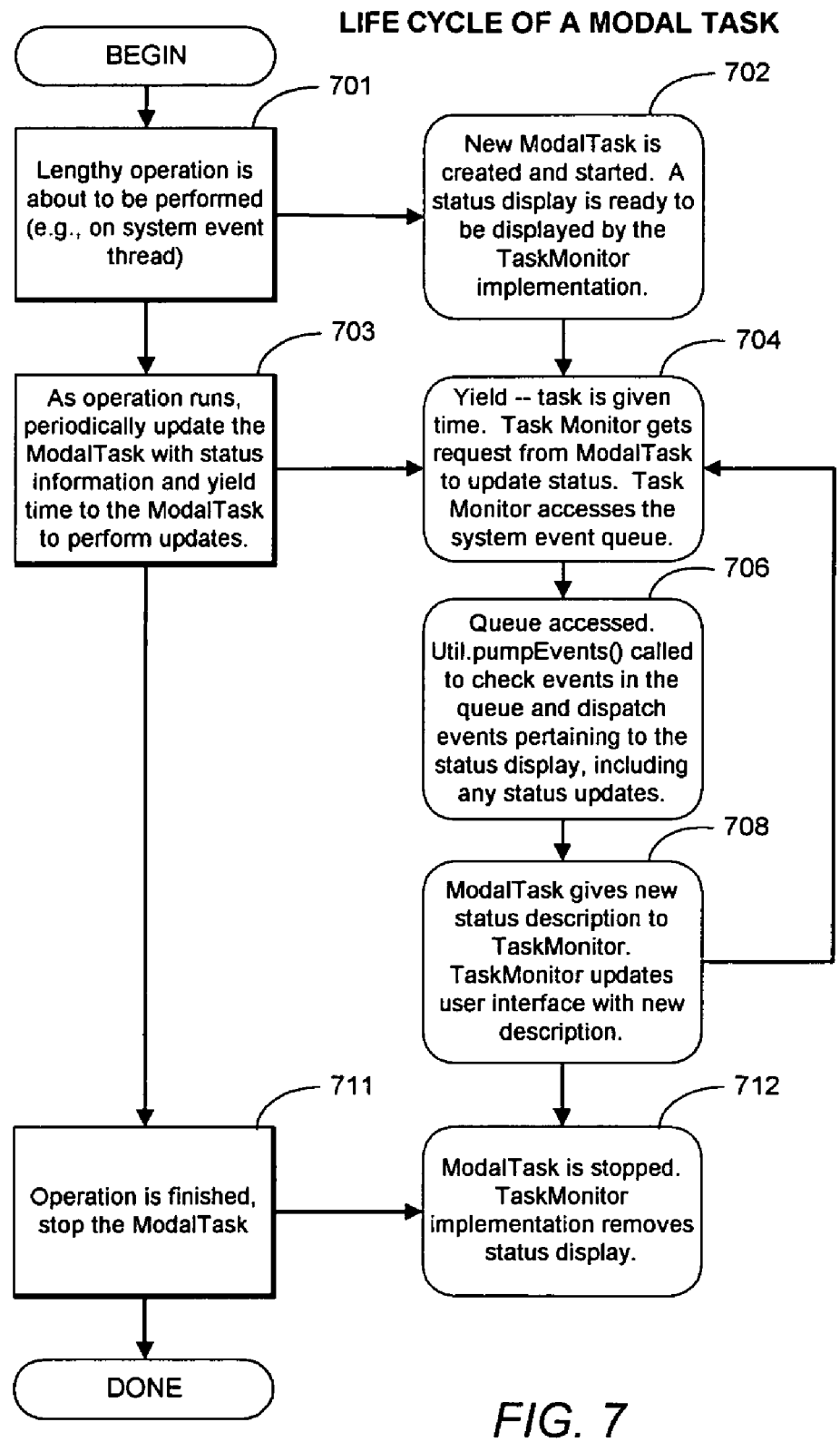
FIG. 7 is a flowchart illustrating the methods of operation of the present invention in monitoring and providing progress indication regarding an exemplary modal task.

FIG. 7 is a flowchart 700 illustrating the methods of operation of the present invention in monitoring and providing progress indication regarding an exemplary modal task. The left side (blocks 701, 703, 711) of FIG. 7 illustrates a modal task or operation (e.g., a potentially lengthy operation) that is being performed (e.g., on the system event thread). The right side (blocks 702, 704, 706, 708, 712) of FIG. 7 illustrates the operations of the system of the present invention in providing task monitoring and progress notification regarding an exemplary modal task. The following description uses the processing of a single modal task to illustrate the operation of the present invention; however the Task Monitor of the present invention may be used to monitor one or more tasks (represented by ModalTask objects) at a time. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

As shown at block 701, the process commences when a lengthy or potentially lengthy task or operation (i.e., a modal task) is about to be performed. Modal tasks are typically lengthy operations. For this reason, among others, modal tasks are frequently performed on the system event thread because use of the event thread enables faster processing. Use of the event thread may also avoid potential thread synchronization problems.

When the modal task (or operation) is about to be performed, a new ModalTask object is created and started as shown at block 702 to monitor the operation (i.e., the processing of the modal task). A status display is prepared (i.e., initialized and made ready to be displayed) by the Task Monitor (e.g., the Swing implementation of the TaskMonitor framework) to provide the user with feedback as to the status of the operation. Feedback may be provided to the user via a dialog box in a graphical user interface (e.g., using the Swing-TaskMonitor implementation described above) or through alternative means. For example, a developer may use the TaskMonitor framework of the present invention to implement a task monitor which provides user notification via a console instead of through a dialog box displayed in a graphical user interface.

As the modal task runs, the task periodically updates the ModalTask object about the status of the operation as shown at block 703. For example, the task that is running calls a "setStatus" method of a ModalTask class to inform the ModalTask object that it has changed status. The timing and frequency of status updates by the modal task to the ModalTask object are configurable by a developer, as desired. For example, a particular modal task may provide a status change notification to the ModalTask object when the task is fifty percent (50%) complete. When the ModalTask object receives a status update, the ModalTask object notifies the Task Monitor of this status change.

In response to this notification from the ModalTask object, the Task Monitor requests the operation (i.e., the modal task) to yield time to the Task Monitor to perform the tasks shown at blocks 704-708 so that the user can be notified of the status change (e.g., via updated dialog in the user interface). At block 704, the operation (i.e., the modal task) yields time to the Task Monitor to enable the Task Monitor to access the system event queue. At block 706, the Task Monitor accesses the system event queue and checks events in the event queue. Those events in the queue that pertain to the status display are identified and processed. In the current preferred embodiment a "pumpEvents" method processes events in the event queue as hereinafter described. These events may include user input, such determining whether the user wishes to cancel running the lengthy operation. Other events that are of interest include updates to the status of the lengthy operation.

As shown at block 706, the status description may need to be updated based upon status updates in the event queue. For example, the status description may change from "more than one minute remaining" to "less than one minute remaining". As shown at block 708, the Task Monitor will update the user interface with the new status description received from the ModalTask object. The process illustrated at blocks 704-708 may be repeated several times while the lengthy operation is running. The operation will periodically yield time to the Task Monitor for the Task Monitor to perform these tasks. The frequency of these yields is configurable by a developer/user as desired.

When the operation is finished (or is terminated) as shown at block 711, the ModalTask is stopped as indicated at block 712. The ModalTask object is stopped when the operation finishes processing or, in the case of an operation that is cancelable by the user, the ModalTask object is stopped in the event of user cancellation. In the currently preferred embodiment, the ability to cancel an operation is optional. A developer may elect to allow a user to cancel an operation or may instead elect not to permit cancellation for certain operations (e.g., in the event cancellation of an operation would leave the system in an inconsistent state). The Task Monitor removes the status display (e.g., deletes dialog box from user interface) after completion or termination as shown at block 712. The specific process involved for providing status notification to the user as a modal task is running will now be described in greater detail.

Detailed Operation

ModalTask Objects for Representing Tasks

As described above, modal tasks which may require lengthy processing and typically block user activity until they are completed are represented in the system of the present invention as "ModalTask" objects. When a given modal task (or operation) is to be performed, a new ModalTask object is created and started to monitor the operation (i.e., the processing of the modal task) as illustrated in the following Modal-Task class:

```
 1:   package com.borland.primetime.util;
 2:
 3:   import java.util.ArrayList;
 4:   import java.util.HashMap;
 5:   import java.util.Iterator;
 6:
 7:   public class ModalTask {
 8:       private static ArrayList activeTaskList = new ArrayList( );
 9:       private static TaskMonitor monitor;
10:       private String description;
11:       private boolean cancelAllowed;
12:       private boolean cancelRequested;
13:       private boolean active;
14:       private HashMap hints;
15:
16:       /**
17:        * Create a new inactive ModalTask
18:        *
19:        * @param description A short immutable description of the task
20:        * being performed
21:        * @param isCancelAllowed True if the task will check
22:        * isCancelRequested( ) in order to stop the task, false if the task
23:        * cannot be interrupted
24:        */
25:       public ModalTask(String description, boolean isCancelAllowed) {
26:           this.description = description;
27:           this.cancelAllowed = isCancelAllowed;
28:       }
29:
30:       /**
31:        * Retrieves the task description.
32:        * @return short immutable task description that was set when task was
         created.
33:        */
34:       public String getDescription( ) {
35:           return description;
36:       }
37:
38:       /**
39:        * Make an inactive task active
40:        */
41:       public void start( ) {
42:           if (active)
43:               throw new IllegalStateException("Active tasks cannot be started again");
          //NORES
44:           active = true;
45:           activeTaskList.add(this);
46:
47:           // Notify the monitor, and use a local copy to guarantee another
48:           // thread isn't switching the monitor out from under us
49:           TaskMonitor monitor = ModalTask.monitor;
50:           if (monitor != null) {
51:               monitor.taskStarted(this);
52:               monitor.yield( );
53:           }
54:       }
55:   /**
56:        * Make an active task inactive
57:        */
```

```
 58:         public void stop( ) {
 59:             if (!active)
 60:                 throw new IllegalStateException("Inactive tasks cannot be stopped");//NORES
 61:             active = false;
 62:             cancelRequested = false;
 63:             activeTaskList.remove(this);
 64:
 65:             // Notify the monitor, and use a local copy to guarantee another
 66:             // thread isn't switching the monitor out from under us
 67:             TaskMonitor monitor = ModalTask.monitor;
 68:             if (monitor != null) {
 69:                 monitor.taskStopped(this);
 70:                 monitor.yield( );
 71:             }
 72:         }
 73:
 74:         /**
 75:          * Reports incremental progress made by the task
 76:          *
 77:          * @param status A short description of the most recent progress
 78:          * made by the task
 79:          */
 80:         public void setStatus (String status) {
 81:             if (!active)
 82:                 throw new IllegalStateException("Inactive tasks cannot report status
        changes");//NORES
 83:
 84:             // Notify the monitor, and use a local copy to guarantee another
 85:             // thread isn't switching the monitor out from under us
 86:             TaskMonitor monitor = ModalTask.monitor;
 87:             if (monitor != null) {
 88:                 monitor.taskStatusChanged(this, status);
 89:                 monitor.yield( );
 90:             }
 91:         }
 92:
 93:         /**
 94:          * Reports whether or not this task is active
 95:          *
 96:          * @return True if the task has been started but not stopped, false
 97:          * otherwise
 98:          */
 99:         public boolean isActive( ) {
100:             return active;
101:         }
102:
103:         /**
104:          * Reports whether or not this task can be canceled
105:          *
106:          * @return True if the task will check isCancelRequested( ), false otherwise
107:          */
108:         public boolean isCancelAllowed( ) {
109:             return cancelAllowed;
110:         }
111:
112:         /**
113:          * Reports whether or not this task should be canceled, typically
114:          * as a result of a user request
115:          *
116:          * @return True if the task should be stopped prematurely, false otherwise
117:          */
118:         public boolean isCancelRequested( ) {
119:             yield( );
120:             return cancelRequested;
121:         }
122:
123:         /**
124:          * Determines whether or not this task should be canceled. This
125:          * method is typically invoked with "true" by the TaskMonitor in
126:          * response to a user event.
127:          *
128:          * @param cancelRequested True if the task should be prematurely
129:          * stopped, false otherwise
130:          */
131:         public void setCancelRequested(boolean cancelRequested) {
132:             if (cancelRequested && !cancelAllowed)
133:                 throw new IllegalStateException("This task cannot be canceled");//NORES
134:             this.cancelRequested = cancelRequested;
135:         }
```

```
136:
137:        /**
138:         * Fetches an arbitrary hint object from this task, allowing tasks
139:         * to communicate TaskMonitor-specific information through the
140:         * general ModalTask abstraction
141:         *
142:         * @param key The key that will be used to retrieve the hint
143:         * @param value A value to associate with the specified key, or
144:         * null if the hint is to be removed
145:         */
146:        public synchronized void setHint(Object key, Object value) {
147:             if (hints == null)
148:                  hints = new HashMap( );
149:
150:             if (value == null) {
151:                  hints.remove(key);
152:                  if (hints.size( ) == 0)
153:                       hints = null;
154:             }
155:             else
156:                  hints.put(key, value);
157:
158:             // Notify the monitor, and use a local copy to guarantee another
159:             // thread isn't switching the monitor out from under us
160:             TaskMonitor monitor = ModalTask.monitor;
161:             if (monitor != null) {
162:                  monitor.taskHintChanged(this, key, value);
163:                  monitor.yield( );
164:             }
165:        }
166:
167:        /**
168:         * Fetches an arbitrary hint object from this task, allowing tasks to
169:         * communicate TaskMonitor-specific information through the general
170:         * Task abstraction
171:         *
172:         * @param key The key used to set the hint
173:         * @return The hint value associated with the key, or null if no hint
174:         * has been set for the specified key
175:         */
176:        public synchronized Object getHint(Object key) {
177:             if (hints == null)
178:                  return null;
179:             return hints.get(key);
180:        }
181:
182:        /**
183:         * Lists all active tasks
184:         *
185:         * @return An array of all ModalTask objects that have been started
186:         * but not stopped
187:         */
188:        public static ModalTask[ ] getActiveTasks( ) {
189:             return (ModalTask[ ])activeTaskList.toArray(new
        ModalTask[activeTaskList.size( )]);
190:        }
191:
192:        /**
193:         * Changes the current TaskMonitor implementation. Only a single
194:         * TaskMonitor may be in use at any given time.
195:         *
196:         * @param monitor A concrete TaskMonitor implementation responsible for
197:         * reporting task progress
198:         */
199:        public static void setTaskMonitor(TaskMonitor monitor) {
200:             TaskMonitor oldMonitor = ModalTask.monitor;
201:             ModalTask.monitor = monitor;
202:
203:             // Transfer active tasks from any existing monitor to the new monitor
204:             Iterator iterator = activeTaskList.iterator( );
205:             while (iterator.hasNext( )) {
206:                  ModalTask task = (ModalTask)iterator.next( );
207:                  if (oldMonitor !=null)
208:                       oldMonitor.taskStopped(task);
209:                  if (monitor != null)
210:                       monitor.taskStarted(task);
211:             }
212:        }
213:
```

```
214:        /**
215:         * Allows the current TaskMonitor to yield time to user interaction
216:         */
217:        public static void yield( ) {
218:
219:            // Delegate to the monitor, and use a local copy to guarantee
220:            // another thread isn't switching the monitor out from under us
221:            TaskMonitor monitor = ModalTask.monitor;
222:            if (monitor != null)
223:                monitor.yield( );
224:        }
225:    }
```

Before a ModalTask object may be used, it is constructed. As shown above at lines 25-28 a new ModalTask object is created with two input parameters: "Description", a String which describes the task being performed (i.e., the underlying model task); and "isCancelAllowed" which indicates whether the modal task is cancelable. If a developer does not want a particular task to be interrupted, "isCancelAllowed" can be set to false. If it is set to true, the "is Cancel Requested( )" method shown at lines 118-121 is checked periodically to determine if the user wishes to cancel the modal task. Hints that may be used by the TaskMonitor object are also set when the object is created.

When a modal task is to be processed, the "start( )" method of this ModalTask class is invoked as illustrated at lines 41-54. As shown at lines 49-53, the ModalTask notifies the Task Monitor that a modal task has started. Of particular interest, after the processing of the modal task has commenced, progress made by the task is reported by calls made to the "setStatus( )" method of ModalTask as shown above at lines 80-91. As illustrated at lines 86-90, when this "setStatus( )" method is called, the Task Monitor is notified of the status update and frequent calls to "monitor.yield 0" (e.g., at line 89) ensure that the Task Monitor may refresh (i.e., update) the user interface. A task that can be canceled also typically calls "is CancelRequested( )" periodically as shown at lines 118-121 to determine if the user has requested the processing of the modal task to be canceled. When the task completes normally or is canceled, the "stop( )" method is invoked as provided at lines 58-72.

TaskMonitor Framework

In the currently preferred embodiment, the actual communication of status information to a user is provided by an implementation of the TaskMonitor framework. The TaskMonitor framework enables different behavior to be provided for command-line and graphical user interfaces without impacting other portions of the system. The following abstract TaskMonitor class illustrates the framework that may be implemented for progress reporting:

```
1:     package com.borland.primetime.util;
2:
3:     public abstract class TaskMonitor {
4:
5:         /**
6:          * Notifies the task monitor that a new task has become active
7:          *
8:          * @param task The task that has become active
9:          */
10:        public abstract void taskStarted(ModalTask task);
11:
12:        /**
13:         * Notifies the task monitor that an existing task is now inactive
14:         * @param task The previously active task that is now inactive
15:         */
16:        public abstract void taskStopped(ModalTask task);
17:
18:        /**
19:         * Notifes the task monitor that a new status message is available for
20:         * one of the active tasks
21:         *
22:         * @param task The active task whose status has changed
23:         * @param status An internationalized description suitable for display
24:         * to users
25:         */
26:        public abstract void taskStatusChanged(ModalTask task, String status)
27:
28:        /**
29:         * Notifies the task monitor that a hint has been added or removed
30:         * to a task. Task monitors may use hints to communicate additional
31:         * information about the state of a task, but are required to ignore
32:         * unfamiliar hints. Only hints that change after a task is started
33:         * are reported in this manner, task monitors typically request
34:         * interesting hints during taskStarted( ) and update them dynamically
35:         * via this method.
36:         *
```

```
37:        * @param task The active task for which a hint has been changed
38:        * @param key The key associated with the altered hint
39:        * @param value The new hint value, or null if the hint was removed
40:        */
41:       public abstract void taskHintChanged(ModalTask task, Object key, Object value);
42:
43:       /**
44:        * Allows the task monitor to regain control periodically when tasks
45:        * run on the main thread
46:        */
47:       public abstract void yield( );
48:   }
```

As illustrated above, the API defined by the TaskMonitor framework (i.e., the above abstract TaskMonitor class) includes the following:

"taskStarted(ModalTask task)" as shown at line 10 for notifying the Task Monitor that a new task has become active;

"taskStopped(ModalTask task)" illustrated at line 16 for notifying the Task Monitor that an existing task is now inactive;

"taskStatusChanged(ModalTask task, String status)" shown at line 26 notifies the Task Monitor that a new status message ("String status") is available for one of the active tasks;

"taskHintChanged(ModalTask task, Object key, Object value)" at line 41 is for informing the Task Monitor that a hint has been added to or removed from a task. Task Monitors may use hints to communicate additional information about the state of a task, but are required to ignore unfamiliar hints. The Task Monitor typically requests interesting hints during "taskStarted( )" and updates or changes after a task has started dynamically via this "taskHintChanged" method; and "yield( )" as shown at line 47 allows the Task Monitor to regain control (e.g., access the event queue) periodically when tasks run on the main thread.

Task Monitor Implementation

Subclasses of the above abstract TaskMonitor class are used to provide a concrete user interface. The following SwingTaskMonitor class illustrates an implementation of the abstract TaskMonitor framework provided in the currently preferred embodiment for progress reporting via a graphical user interface:

```
1:    package com.borland.primetime.ui;
2:
3:    import com.borland.primetime.util.ModalTask;
4:    import com.borland.primetime.util.TaskMonitor;
5:
6:    import java.awt.*;
7:    import java.awt.event.ActionEvent;
8:    import java.awt.event.ActionListener;
9:    import java.awt.event.InputEvent;
10:   import javax.swing.JButton;
11:   import javax.swing.JDialog;
12:   import javax.swing.SwingUtilities;
13:
14:   import com.borland.primetime.ide.Browser;
15:   import com.borland.primetime.util.Images;
16:
17:   /**
18:    * Swing-aware TaskMonitor implementation that uses a combination of
19:    * wait cursors and modal dialogs to communicate the presence of modal tasks.
20:    */
21:   public class SwingTaskMonitor extends TaskMonitor {
22:
23:       /**
24:        * Hint for setting a custom icon in the progress dialog
25:        */
26:       public static final String HINT_KEY_ICON = "swingtask.icon"; //NORES
27:
28:       /**
29:        * Hint for customizing the dialog update interval. Default update
30:        * interval is 500 milliseconds.
31:        */
32:       public static final String HINT_UPDATE_INTERVAL = "swingtask.updateInterval";
33:       /**
34:        * Hint for customizing the wait cursor interval. Default interval
35:        * is 2 seconds.
36:        */
37:       public static final String HINT_WAIT_CURSOR_INTERVAL =
              "swingtask.waitCursorinterval"; //NORE
38:
39:       /**
40:        * Default dialog update interval. The update request for the
```

```
41:         * particular task does not get process if the last change occurred
42:         * less than this interval.
43:         */
44:         public static final int DEFAULT_UPDATE_INTERVAL = 500;
45:
46:         private static final int STATE_NONE           = 0;
47:         private static final int STATE_WAIT_CURSOR    = 1;
48:         private static final int STATE DIALOG         = 2;
49:
50:         /**
51:          * The state of this global modal task monitor as a bit field, may
52:          * be any combination of the available states, or STATE_NONE if
53:          * none of the states are active
54:          */
55:         private int state STATE_NONE;
56:
57:         /** Contains the time the active task count was last incremented to 1 */
58:         private long startTime;
59:
60:         /** Contains the time the active task count was last decremented to 0 */
61:         private long endTime;
62:
63:         private int taskCount            = 0;
64:         private int waitCursorInterval   = 2000;
65:         private int statusUpdateInterval = DEFAULT_UPDATE_INTERVAL;
66:
67:         private TaskDialog dialog;
68:
69:         // Javadoc inherited from ancestor
70:         public synchronized void taskStarted(final ModalTask task) {
71:             /**
72:              */
73:             if (taskCount++ == 0) {
74:                 // Update the start time unless it appears that a series of
75:                 // modal tasks taking place, then leave the start time alone to acurately
76:                 // preserve wait cursor or dialog visibility across tasks
77:                 long currentTime = System.currentTimeMillis( );
78:                 if (currentTime > endTime + 100)
79:                     startTime = currentTime;
80:                 else
81:                     yield( );
82:
83:                 if (!SwingUtilities.isEventDispatchThread( )}
84:                     tieUpEventThread( );
85:             }
86:
87:             if (SwingUtilities.isEventDispatchThread( )) {
88:                 _taskStarted(task);
89:             }
90:             else {
91:                 SwingUtilities.invokeLater(new Runnable( ) {
92:                     public void run( ) {
93:                         _taskStarted(task);
94:                     }
95:                 });
96:             }
97:         }
98:
99:         private void _taskStarted(ModalTask task) {
100:            if ((state & STATE_DIALOG) != 0)
101:                updateDialog( );
102:
103:            // process any startup supported hints
104:            Object waitCursorHint = task.getHint(HINT_WAIT_CURSOR_INTERVAL);
105:            if ((waitCursorHint != null) && (waitCursorHint instanceof Integer))
106:                waitCursorInterval = ((Integer) waitCursorHint).intValue( );
107:                if (waitCursorInterval == 0) {
108:                    setState(STATE_WAIT_CURSOR | STATE_DIALOG);
109:                }
110:            }
111:
112:            Object updateIntervalHint = task.getHint(HINT_UPDATE_INTERVAL);
113:            if ((updateIntervalHint != null) && (updateIntervalHint instanceof Integer)) {
114:                statusUpdateInterval = ((Integer)updateIntervalHint).intValue( );
115:                if ((state & STATE_DIALOG) != 0) {
116:                    dialog.setUpdateInterval(statusUpdateInterval);
117:                }
118:            }
119:        }
```

-continued

```
120:    // Javadoc inherited from ancestor
121:        public synchronized void taskStopped (ModalTask task) {
122:            --taskCount;
123:    //Not sure if necessary but seems like a good idea to make sure the
124:    //taskstopped absolutely happens last so always invoke later
125:    //          if (SwingUtilities.isEventDispatchThread( )) {
126:    //              _taskStopped( );
127:    //          }
128:    //          else {
129:                SwingUtilities.invokeLater(new Runnable( ) {
130:                    public void run( ) {
131:                        _taskStopped( );
132:                    }
133:                });
134:    //          }
135:        }
136:
137:        private void _taskStopped( ) {
138:            if (taskCount == 0) {
139:                setState(STATE_NONE);
140:                endTime = System.currentTimeMillis( );
141:            }
142:
143:            if ((state & STATE_DIALOG) != 0)
144:                updateDialog( );
145:
146:            // put a repaint call into the event queue to try to make sure
147:            // that the browser cleans up any visual artifacts after a task
148:            // has stopped/finished.
149:
150:            if (com.borland.primetime.ide.Browser.getActiveBrowser( ) != null)
151:                com.borland.primetime.ide.Browser.getActiveBrowser( ).repaint( );
152:        }
153:
154:        // Javadoc inherited from ancestor
155:        public synchronized void taskHintChanged(final ModalTask task, final Object
            key, final Object value) {
156:            if (SwingUtilities.isEventDispatchThread( )) {
157:                _taskHingchanged(task, key, value);
158:            }
159:            else {
160:                SwingUtilities.invokeLater(new Runnable( ) {
161:                    public void run( ) {
162:                        _taskHingChanged(task, key, value);
163:                    }
164:                });
165:            }
166:        }
167:
168:        private void _taskHingChanged(ModalTask task, Object key, Object value) {
169:            if ((state & STATE_DIALOG) != 0)
170:                dialog.updateTaskHint(task, key, value);
171:        }
172:
173:        // Javadoc inherited from ancestor
174:        public synchronized void taskStatusChanged(final ModalTask task, final String
            status) {
175:            if (SwingUtilities.isEventDispatchThread( )) {
176:                _taskStatusChanged(task, status);
177:            }
178:            else {
179:                SwingUtilities.invokeLater(new Runnable( ) {
180:                    public void run( ) {
181:                        _taskStatusChanged(task, status);
182:                    }
183:                });
184:            }
185:        }
186:
187:        private void _taskStatusChanged(ModalTask task, String status) {
188:            if ((state & STATE_DIALOG) != 0)
189:                dialog.updateStatus(task, status);
190:        } // . . .
```

As shown at line 21, the above SwingTaskMonitor class extends the abstract TaskMonitor class (i.e., implements the TaskMonitor framework) to provide a concrete implementation for monitoring of tasks and display of progress indication. Recall that when a particular task provides a status update to its corresponding ModalTask object (e.g., via a call to the "setStatus( )" method of ModalTask), the ModalTask object notifies the Task Monitor of the status change. More particularly, the "setStatus( )" method of the above-described ModalTask class calls "taskStatusChanged" as shown at line 174 and passes in an identifier of a modal task and a String description of the status change as arguments. The status description may, for example, indicate that processing of a modal task is fifty percent complete. At lines 175-181 a determination is made as to what thread the task is running on and, if it is the event thread, a "_taskStatusChanged(ModalTask task, String status)" method is invoked. As illustrated at lines 187-190, this method updates the dialog displayed to the user (e.g., by causing the new status information received from the ModalTask to be displayed in the user interface).

As previously described, after the Task Monitor is notified, the ModalTask object calls the following portion of the SwingTaskMonitor class includes a "yield( )" method to allow the Task Monitor to process user interface events:

```
1:   // yield method of Task Monitor class
2:   private static boolean yielding = false;
3:   public synchronized void yield( ) {
4:       if (taskCount == 0)
5:           return;
6:
7:       if (yielding) {
8:           return;
9:       }
10:
11:      try {
12:          yielding = true;
13:
14:          // Advance to wait cursor or dialog when the right amount of time passes
15:          boolean isEventThread = SwingUtilities.isEventDispatchThread( );
16:          if ( (state & STATE_DIALOG) != 0) {
17:
18:              // Handle events in a modal fashion when called from a task tying up the
19:              // event thread
20:              if (isEventThread) {
21:                  Util.pumpEvents(dialog);
22:              }
23:          }
24:          else {
25:              if (isEventThread) {
26:                  _yield( );
27:              }
28:              else {
29:                  SwingUtilities.invokeLater(new Runnable( ) {
30:                      public void run( ) {
31:                          _yield( );
32:                      }
33:                  });
34:              }
35:          }
36:      }
37:      finally {
38:          yielding = false; 39:         }
40:  }
41:
42:  private void _yield( ) {
43:      long time = System.currentTimeMillis( );
44:      if (startTime + waitCursorInterval <= time)
45:          setState(STATE_WAIT_CURSOR | STATE_DIALOG);
46:      else if (startTime + 500 <= time)
47:          setState(STATE_WAIT_CURSOR);
48:  }
49:
50:  /**
51:   * <p>Blocks the event thread, processing events selectively by discarding
52:   * any events not destined for the task monitor dialog, in effect making a
53:   * non-modal dialog act modally. A major reason for this juggling act is
54:   * that it also acts modally <i>before</i>the dialog appears - which would
55:   * otherwise be impossible.</p>
56:   *
57:   * <p>Note that this method must not be invoked while on the event
58:   * thread. The caller is expected to take the appropriate precautions. </p>
59:   */
60:  private void tieUpEventThread( ) {
61:
62:      // Tie up the event thread until no more tasks are active
63:      SwingUtilities.invokeLater(new Runnable( ) {
64:          public void run( ) {
```

-continued

```
65:
66:            // Build a component to treat modally when the dialog isn't available
67:            // and pump events until no more modal tasks exist
68:            Component fakeComponent = new JButton( );
69:            while (taskCount > 0) {
70:                Component modalComponent = dialog;
71:                if (modalComponent == null)
72:                    modalComponent = fakeComponent;
73:                Util.pumpEvents(modalComponent);
74:                try {Thread.sleep(100); } catch (Exception ex) { }
75:            }
76:        }
77:    });
78: }
79:
80: /**
81:  * <p>Change the monitor state as a bit field combining any of the defined
82:  * constants:</p>
83:  * <ul>
84:  *     <li>STATE_WAIT_CURSOR when a wait cursor notifies the user that a short
85:  *         time has passed since the task started</li>
86:  *     <li>STATE_DIALOG when a dialog is communicating more detailed information
87:  *         to the user after a longer wait</li>
88:  * </ul>
89:  * <p>The special constant STATE_NONE is defined to indicate when none of
90:  * these states are active
91:  *
92:  * @param newState The desired target state
93:  */
94: private void setState(final int newState) {
95:     if (state == newState)
96:         return;
97:
98:     changeStates(state, newState);
99:     state = newState;
100: }
101:
102: /**
103:  * Perform the necessary side effects of a state change. This method is
104:  * guaranteed to be called on the event thread by setState( ) and should never
105:  * be called from anywhere else.
106:  *
107:  * @param oldState The original state
108:  * @param newState The new state
109:  */
110: private void changeStates(int oldState, int newState) {
111:
112:     // Getting rid of the dialog?
113:     if ((oldState & STATE_DIALOG) != 0 &&
114:         (newState & STATE_DIALOG) == 0) {
115:     dialog.dispose( );
116:     dialog = null;
117: }
118:
119: // Getting rid of the wait cursor?
120: if ((oldState & STATE_WAIT_CURSOR) != 0 &&
121:         (newState & STATE_WAIT_CURSOR) == 0) {
122:     Util.setGlobalCursor(
123:                     Cursor.getPredefinedCursor (Cursor.WAIT_CURSOR),
124:                     Cursor.getPredefinedCursor(Cursor.DEFAULT_CURSOR));
125: }
126:
127: // Introducing the wait cursor?
128: if ((oldState & STATE_WAIT_CURSOR) == 0 &&
129:         (newState & STATE_WAIT_CURSOR) != 0) {
130:     Util.setGlobalCursor(
131:                     Cursor.getPredefinedCursor(Cursor.DEFAULT_CURSOR),
132:                     Cursor.getPredefinedCursor(Cursor.WAIT_CURSOR));
133: }
134:
135: // Introducing the dialog? (Note that this takes place AFTER the wait
136: // cursor to avoid setting the wait cursor on the dialog!)
137: if ((oldState & STATE_DIALOG) == 0 &&
138:         (newState & STATE_DIALOG) != 0)
139:     showDialog( );
140: }
141:
142: /**
143:  * Create and display a dialog to reflect progress
```

-continued

```
144:    */
145:    private void showDialog( ) {
146:
147:        // This absurdity attempts to find the correct owner for the newly
148:        // created dialog, and is necessary because JDialog has two different
149:        // constructors for Dialog owners and Frame owners
150:        Component focusComponent = Util.getFocusedComponent( );
151:        Window window = null;
152:        if (focusComponent != null)
153:            window = SwingUtilities.getWindowAncestor(focusComponent);
154:        while (true) {
155:            if (window == null) {
156:                // If the parent window is null, create a dummy parent frame that
157:                // has an icon
158:                Frame frame = new Frame( );
159:                Browser.applyBrowserIcon(frame);
160:                dialog = new TaskDialog(frame);
161:                break;
162:            }
163:            if (window instanceof Dialog) {
164:                dialog = new TaskDialog((Dialog)window);
165:                break;
166:            }
167:            if (window instanceof Frame) {
168:                dialog = new TaskDialog((Frame)window);
169:                break;
170:            }
171:            window = window.getOwner( );
172:        }
173:
174:        // Once the dialog has been created, set its initial state and show it
175:        dialog.setDefaultCloseOperation(dialog.DO_NOTHING_ON_CLOSE);
176:        dialog.setUpdateInterval(statusUpdateInterval);
177:        updateDialog( );
178:        dialog.show( );
179:    }
180:
181:    /**
182:     * Bring the dialog content up to date with the state of the active tasks
183:     */
184:    private void updateDialog( ) {
185:        ModalTask[ ] tasks = ModalTask.getActiveTasks( );
186:        dialog.setTasks(tasks);
187:    }
188: }
```

As previously described, the ModalTask object calls the "yield( )" method of the Task Monitor illustrated commencing at line 3. This "yield( )" method is responsible for managing the thread and allowing time to actually update the progress dialog displayed in the user interface. Next, as shown at line 20 a check is made to determine if the modal task is running on the event thread. If so, a "Util.pumpEvents" method is called at line 21 to process events in the event queue. This "Util.pumpEvents" method for processing events in the event queue that relate to the progress indication displayed to the user is described below.

Processing of Events in Event Queue

The following "pumpEvents" method of a utility class ("Util") emulates a Swing event processing loop to allow tasks to yield time for processing events in the event queue:

```
1:  /**
2:   * <p>Note that when processing events in a modal fashion events
3:   * queued for other components are discarded, not queued for later proceccsing.
4:   * This is consistent with true modal dialog behavior.</p>
5:   *
6:   * @param modalComponent A component to restrict event processing
7:   * to or null if event processing should not be restricted
8:   */
9:  public static void pumpEvents(Component modalComponent) {
10:     EventQueue theQueue = Toolkit.getDefaultToolkit( ).getSystemEventQueue( );
11:
12:     // Ensure that at least one event is waiting, and then deal with
13:     // all pending events . . .
14:     theQueue.postEvent(new FakeEvent(modalComponent, 0) { });
15:     while (theQueue.peekEvent( ) != null) {
16:         try {
17:             AWTEvent event = theQueue.getNextEvent( );
```

-continued

```
18:            Object src = event.getSource( );
19:            if (event instanceof FakeEvent)
20:                continue;
21:
22:            // Ensure that modality is enforced
23:            if (modalComponent != null) {
24:                while (event instanceof InputEvent) {
25:                    Component c = (Component)src;
26:                    // check if c's modalComponent's child
27:                    if (modalComponent instanceof Container)
28:                        while (c != modalComponent && c != null)
29:                            c = c.getParent( );
30:                    if (c !=modalComponent) {
31:                        event = theQueue.getNextEvent( );
32:                        // update src when updating the event being examined!
33:                        src = event.getSource( );
34:                    }
35:                    else
36:                        break;
37:                }
38:            }
39:
40:            // Dispatch the event
41:            if (event instanceof ActiveEvent) {
42:                ((ActiveEvent)event).dispatch( );
43:            }
44:            else if (src instanceof Component) {
45:                ((Component)src).dispatchEvent(event);
46:            }
47:            else if (src instanceof MenuComponent) {
48:                ((MenuComponent)src).dispatchEvent(event);
49:            }
50:            else {
51:                System.err.println(
52:                    Strings.format("Unable to dispatch event: (0)", event));
                //RES ErrorEventCanNotBeDispatched
53:            }
54:        }
55:        catch (ThreadDeath death) {
56:        }
57:        catch (InterruptedException interruptedException) {
58:        }
59:        catch (Throwable e) {
60:            System.err.println("Exception occurred during event dispatching:");
                //RES EventDispatchingException
61:            e.printStackTrace( );
62:        }
63:    }
64: }
```

As shown at line 9, an instance of the dialog (or "ModalComponent") managed by the Task Monitor is passed in to the above "pumpEvents" method. When invoked, the "pumpEvents" method obtains access to the system event queue as shown at line 10 above ("getSystemEventQueue( )"). The event queue contains a list of events that are pending (i.e., waiting to be processed after the modal task is completed).

The "while" loop commencing at line 15 processes events in the queue to identify those that are relevant for the dialog that is being displayed (or is to be displayed) relating to this particular modal task. When events relevant for this particular modal task and dialog (modal component) are identified, those events are processed (e.g., dispatched as shown at lines 41-49 above). In this manner, the dialog is actually updated (e.g., to reflect status updates regarding the modal task). In addition, if a modal task is cancelable, a check is made to determine if the user has requested the processing of the task to be canceled (e.g., to stop formatting the hard drive). However, other events that are in the queue are ignored in order to enforce modality. For instance, if a user is trying to close a window in an effort to cancel a modal task that is non-cancelable, this window-closing event will be ignored. Events are processed in the manner described above until all events in the queue have been processed (e.g., dispatched or ignored).

The above-described steps for processing status updates regarding a modal task may be repeated while the modal task is running. When the modal task is completed it invokes the previously described "stop( )" method of the ModalTask class. This method of ModalTask, in turn, invokes the "taskstopped" method of the Task Monitor which proceeds to update the dialog with the end result (e.g., modal task completed) and clean up the user interface (e.g., by putting a repaint call into the event queue to make sure that the browser cleans up any visual artifacts after a task has finished).

While the invention is described in some detail with specific reference to a single preferred embodiment and certain alternatives, there is no intent to limit the invention to that particular embodiment or those specific alternatives. For instance, the foregoing discussion uses the example of a software application written in the Java programming language to illustrate the operations of the present invention. However, Java is only one of the possible programming languages with which the present invention may be advantageously utilized.

Accordingly, the references to a Java application in the foregoing discussion are for purposes of illustration and not limitation. Those skilled in the art will appreciate that modifications may be made to the preferred embodiment without departing from the teachings of the present invention.

The invention claimed is:

1. A method for providing status information about a task being processed on a computer system, the method comprising:
    obtaining status information about a task during processing of the task on an event thread of a computer system, the task comprising an operation that blocks user activity on the event thread;
    generating a status display based upon the status information;
    providing for the task to yield time on the event thread to enable the status display to be generated and displayed; and
    displaying the status display in the user interface of the computer system.

2. The method of claim 1, further comprising:
    processing pending events which relate to the task when the task yields time on the event thread.

3. The method of claim 2, wherein said step of processing pending events includes checking for a request to cancel processing of the task.

4. The method of claim 2, wherein said step of processing pending events includes generating the status display in the user interface.

5. The method of claim 2, wherein said step of processing pending events includes updating the status display.

6. The method of claim 2, wherein said step of processing pending events includes receiving user input.

7. The method of claim 1, wherein said status display includes a cancel button enabling a user to cancel the processing of the task.

8. The method of claim 1, wherein said user interface includes a graphical user interface.

9. The method of claim 1, wherein said user interface includes a console-based user interface.

10. The method of claim 1, wherein said step of obtaining status information includes the substeps of:
    creating an object to represent the task; and
    providing for the task to periodically update said object with status information.

11. The method of claim 1, wherein the task comprises a modal task.

12. A computer-readable medium having computer-executable instructions for performing the method of claim 1.

13. A downloadable set of computer-executable instructions for performing the method of claim 1.

14. A system for providing progress indication about execution of a modal task, the system comprising:
    a modal task being executed on an event thread of a computer system;
    a modal task object for representing the modal task being executed and collecting information about the execution of the modal task;
    a task monitor module for monitoring the modal task object as the modal task executes and generating a progress indication based on the information collected about the execution of the modal task; and
    an event handling module for interrupting execution of the modal task on the event thread to display the progress indication on the computer system.

15. The system of claim 14, wherein the event handling module processes events on the event thread that relate to the modal task.

16. The system of claim 15, wherein said events on the event thread include an update to the progress indication.

17. The system of claim 15, wherein said events on the event thread include user input.

18. The system of claim 15, wherein events on the event thread which do not relate to the modal task are ignored.

19. The system of claim 14, wherein said modal task object indicates whether the modal task is cancelable.

20. The system of claim 14, wherein the progress indication is user-configurable.

21. The system of claim 20, wherein the user may configure a time interval for updating the progress indication.

22. The system of claim 20, wherein the user may customize appearance of the progress indication displayed in the user interface.

23. The system of claim 14, wherein the collected information includes a time remaining to complete the modal task.

24. The system of claim 14, wherein the collected information includes a percentage of processing of the modal task that has been completed.

25. The system of claim 14, wherein said task monitor module monitors a plurality of modal tasks.

26. The system of claim 14, wherein said system is provided as part of a software development tool.

27. A method for processing an operation while providing a status indication to a user on a computer system, the method comprising:
    while processing an operation on a given thread of a computer system, providing for the operation to periodically yield time on the given thread to enable other processing to be performed on the given thread, wherein the given thread comprises an event thread of the computer system; and
    when the operation yields time on the given thread of the computer system, performing the substeps of:
    determining progress made in completing the operation on the given thread;
    preparing a status indication based upon the determination of progress made in completing the operation; and
    providing the status indication to the user.

28. The method of claim 27, further comprising:
    when the operation yields time on the thread, identifying any events on the thread which relate to the operation; and
    processing any identified events.

29. The method of claim 28, wherein said events include a user request to cancel the operation.

30. The method of claim 27, wherein said status indication is displayed in a graphical user interface.

31. The method of claim 30, wherein the status indication includes a cancel button enabling the user to cancel the operation.

32. The method of claim 27, wherein said status indication is displayed in a console-based user interface.

33. The method of claim 27, wherein said status indication is logged to a log file.

34. The method of claim 27, wherein the operation is a modal task.

* * * * *